US010841400B2

(12) United States Patent
Newton

(10) Patent No.: US 10,841,400 B2
(45) Date of Patent: Nov. 17, 2020

(54) REQUEST PROCESSING IN A CONTENT DELIVERY FRAMEWORK

(71) Applicant: Level 3 Communications, LLC, Broomfield, CO (US)

(72) Inventor: Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 637 days.

(21) Appl. No.: 14/570,743

(22) Filed: Dec. 15, 2014

(65) Prior Publication Data

US 2016/0173643 A1 Jun. 16, 2016

(51) Int. Cl.
*G06F 15/173* (2006.01)
*G06F 15/16* (2006.01)
*H04L 29/08* (2006.01)
*H04L 29/06* (2006.01)

(52) U.S. Cl.
CPC ............ *H04L 67/327* (2013.01); *H04L 67/02* (2013.01); *H04L 67/1097* (2013.01); *H04L 67/28* (2013.01); *H04L 67/42* (2013.01); *H04L 67/2842* (2013.01)

(58) Field of Classification Search
CPC ... H04L 67/327; H04L 67/02; H04L 67/1097; H04L 67/28; H04L 67/42; H04L 67/10; H04L 67/2842
USPC ................................ 709/217-219, 223-226
See application file for complete search history.

(56) References Cited

U.S. PATENT DOCUMENTS

| 6,278,992 B1 * | 8/2001 | Curtis ............... G06F 17/30324 707/711 |
| 7,624,155 B1 * | 11/2009 | Nordin ................ H04L 67/1095 709/208 |
| 8,161,183 B2 * | 4/2012 | Boehme ............ G06F 17/30873 709/217 |
| 8,166,031 B2 * | 4/2012 | Zabawskyj ............. H04L 67/28 707/736 |
| 8,180,720 B1 * | 5/2012 | Kovacs ............... H04L 67/2842 706/47 |

(Continued)

FOREIGN PATENT DOCUMENTS

| JP | 2004086317 | 3/2004 |
| WO | WO-2013005758 | 1/2013 |

OTHER PUBLICATIONS

International Search Report dated Mar. 4, 2016, Int'l Appl. No. PCT/US15/065835, Int'l Filing Date Dec. 15, 2015; 3 pgs.

(Continued)

*Primary Examiner* — Bharat Barot

(57) ABSTRACT

A node in a content delivery network (CDN) receives a request for content and determines information about the request. When sufficient information about the content is determined, the request is assigned to an appropriate CD service to process the request; and when insufficient information about the content is determined, the request is assigned to a generic CD service to process the request. The generic CD service processes the request; and provides updated information about the content to be used for processing future requests. An appropriate CD service processing a request may also provide updated information about the content to be used for processing future requests.

19 Claims, 5 Drawing Sheets

(56) References Cited

U.S. PATENT DOCUMENTS

| | | | | |
|---|---|---|---|---|
| 8,719,351 | B2* | 5/2014 | Chen | H04L 67/2828 709/206 |
| 8,799,372 | B1* | 8/2014 | Upadhyay | H04L 67/2828 709/204 |
| 9,148,332 | B2* | 9/2015 | Aikas | H04L 67/1097 |
| 9,426,049 | B1* | 8/2016 | Kalavade | H04L 61/1511 |
| 2007/0192403 | A1* | 8/2007 | Heine | H04W 4/12 709/203 |
| 2012/0023090 | A1* | 1/2012 | Holloway | H04L 63/0281 707/709 |
| 2012/0023530 | A1* | 1/2012 | Xia | H04N 21/23103 725/93 |
| 2012/0198043 | A1 | 8/2012 | Hesketh et al. | |
| 2012/0324108 | A1* | 12/2012 | Kohli | H04L 69/16 709/226 |
| 2014/0173018 | A1* | 6/2014 | Westphal | H04L 67/327 709/217 |
| 2014/0286165 | A1* | 9/2014 | Chowdhury | H04W 4/028 370/235 |

OTHER PUBLICATIONS

Written Opinion of the International Searching Authority dated Mar. 4, 2016, Int'l Appl. No. PCT/US15/065835, Int'l Filing Date Dec. 15, 2015; 4 pgs.

International Preliminary Report on Patentability dated Jun. 20, 2017, Int'l Appl. No. PCT/US15/065835, Int'l Filing Date Dec. 15, 2015; 6 pgs.

Singapore Written Opinion, dated Jan. 31, 2018, Application No. 11201704606X, filed Dec. 15, 2015; 5 pgs.

Extended European Search Report, dated May 14, 201, Application No. 15870880.0, filed Dec. 15, 2015; 8 pgs.

Chinese First Office Action, dated Jan. 19, 2020, Application No. 201580068160.2, filed Dec. 15, 2015; 15 pgs.

Japan Notice of Reasons for Refusal, dated Oct. 25, 2019, Application No. 2017-530707, filed Dec. 15, 2015; 9 pgs.

* cited by examiner

US 10,841,400 B2

REQUEST PROCESSING IN A CONTENT DELIVERY FRAMEWORK

INCORPORATION BY REFERENCE

The following U.S. Patent and published U.S. patent applications are hereby fully incorporated herein by reference for all purposes:
1. U.S. Published Patent Application No. US 2013-0159472, titled "Content Delivery Network," filed Dec. 12, 2012;
2. U.S. Published Patent Application No. US 2013-0159473, titled "Content Delivery Network," filed Dec. 12, 2012;
3. U.S. Published Patent Application No. US 2014-0344399, titled "Origin Server-Side Channel In A Content Delivery Framework," filed Jun. 17, 2014;
4. U.S. Pat. No. 6,185,598, titled "Optimized Network Resource Location," filed Feb. 10, 1998;
5. U.S. Pat. No. 8,015,298 titled "Load-Balancing Cluster," filed Feb. 23, 2009, issued Sep. 6, 2011; and
6. U.S. Pat. No. 8,489,750 titled "Load-Balancing Cluster," filed Sep. 13, 2010, issued Jul. 16, 2013.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to content delivery and content delivery networks, and, more specifically, to request processing in content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

Figure 1:
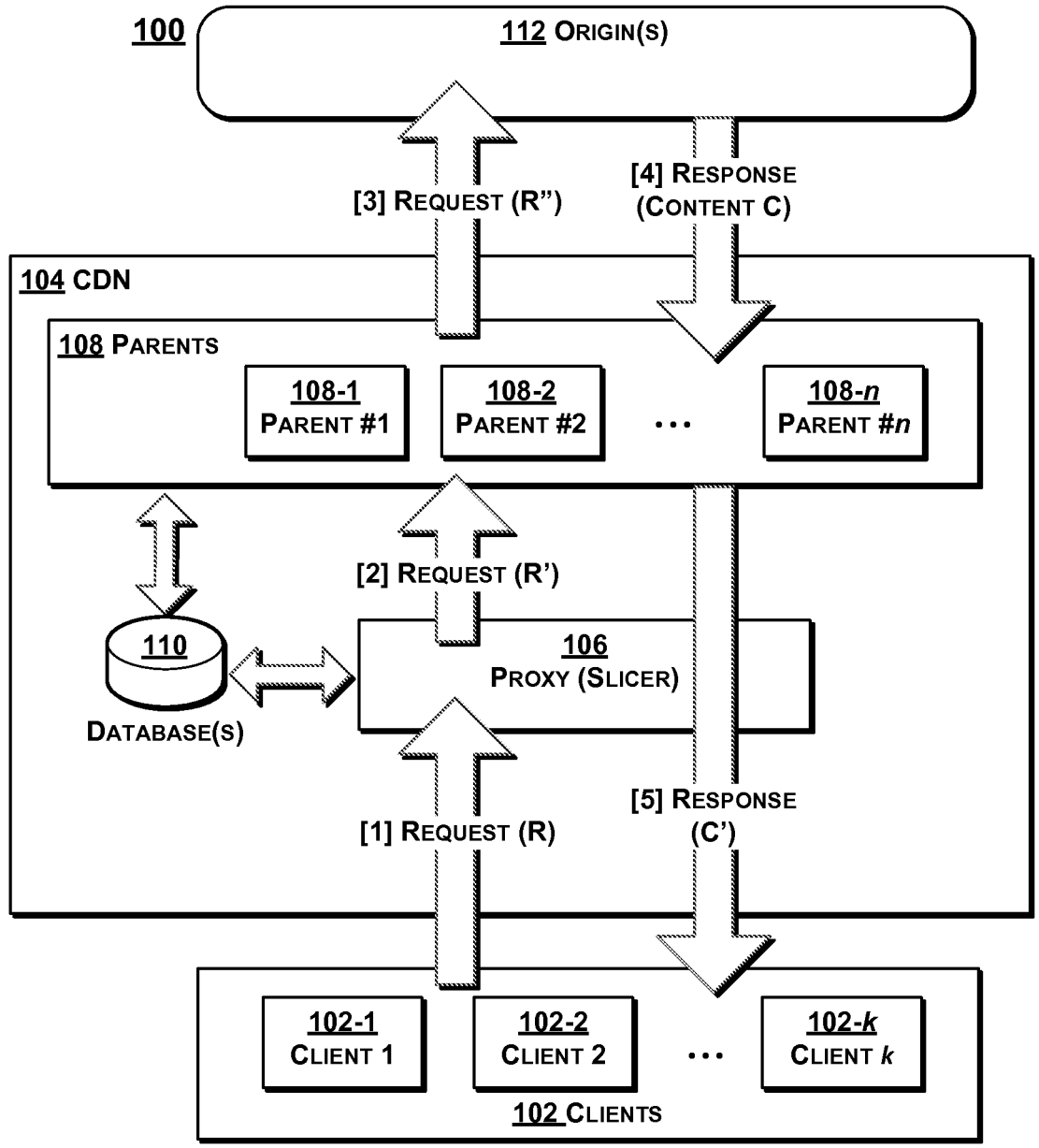
FIG. 1 shows aspects of an exemplary content delivery framework in accordance with an exemplary embodiment hereof.

As used herein, unless used otherwise, the following terms or abbreviations have the following meanings:

CD means Content Delivery;
CDN means Content Delivery Network;
DNS means Domain Name System;
HTTP means Hyper Text Transfer Protocol;
HTTPS means HTTP Secure;
URI means Uniform Resource Identifier; and
URL means Uniform Resource Locator.

Background and Overview

A content delivery network (CDN) distributes content (e.g., resources) efficiently to clients on behalf of one or more content providers, preferably via a public Internet. Content providers provide their content (e.g., resources) via origin sources (origin servers or origins), and a CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Exemplary CDNs are described in U.S. Published Patent Applications Nos. US 2013-0159472 and US 2013-0159473, both filed Dec. 12, 2012; and No. US 2014-0344399, filed Jun. 17, 2014; and U.S. Pat. No. 6,185,598, filed Feb. 10, 1998, the entire contents of each of which has been fully incorporated herein by reference for all purposes.

As used herein, clients are agents (e.g., browsers, set-top boxes, or other applications) used, e.g., by end users to issue requests (e.g., DNS and HTTP requests, which include HTTPS requests) within the system. When no CDN or other intermediaries are in use, such requests may go directly to the subscriber's own servers (e.g., their origin servers) or to other components in the Internet. When a content provider subscribes to CD services (e.g., as described U.S. Published Patent Applications Nos. US 2013-0159472 and US 2013-0159473), various requests may go to intermediate CD services that may map the end-user requests to origin requests, possibly transforming and caching content along the way.

Each distinct origin (e.g., origin server) is typically associated with one subscriber, but a subscriber may be associated with any number of origins, including subscriber-owned and CDN provided origins.

The physical origins with which the CDN interacts may actually be intermediaries that acquire content from a chain of intermediaries, perhaps, e.g., elements of a separate content acquisition system that ultimately terminates at a subscriber's actual origin servers. As far as the internals of the CDN are concerned, however, the origin is that service outside the system boundary from which content is directly acquired.

As used herein, an end user is an entity (e.g., person or organization) that ultimately consumes some Internet service (e.g., a web site, streaming service, etc.) provided by a service provider entity. This provider entity is sometimes referred to as a subscriber in this description because they subscribe to CDN services in order to efficiently deliver their content, e.g., from their origins to their consumers. A CDN may provide value-added mediation (e.g., caching, transformation, etc.) between its subscribers and their end-users.

Request Processing in a CDN

Exemplary operational aspects of a content delivery framework 100 are described here with reference to FIG. 1.

Clients 102 (including, e.g., client 1 102-1, client 2 102-2, ..., client k 102-k) request content via a CDN 104 that serves content on behalf of one or more subscribers. It should be appreciated that clients are generally and preferably unaware that their requests are being handled by a CDN. A particular client request (R) for particular content (C) is directed to a CD service in the CDN to process that request. The client request may be directed to the CD service by a rendezvous mechanism that is part of the CDN or in any known manner. In the drawing in FIG. 1, the request (R) is directed to a proxy (also referred to as a slicer) 106. From the client's perspective the proxy 106 is handling the request. However, the proxy 106 may be a front-end to a number of other CD services (e.g., servers) that may process the client's request. As shown in the drawing in FIG. 1, proxy 106 may select one of parents 108 to process the client request (R). A proxy 106 may be a switch or the like.

As should be understood, the proxy 106 may modify and/or augment a request that it receives from a client (e.g., it may normalize a URL). For this reason the request from client to the proxy is denoted R whereas the request from the proxy to the parent(s) is denote R'. Similarly, the request from the parent(s) to the origin(s) is denoted R". In many cases R may be the same as R' which may be the same as R". Similarly, the content C provided by the origin(s) to the parents may be modified and/or augmented before being provided to the client, hence the notation C' for the response 5 from the parent to the client. In many cases C may be the same as C', and there is no requirement for any modification. Modification of content may include the addition of metadata, reformatting, etc.

Preferably the selected parent CD service is one that is appropriate for the kind of request it is given. For example, some CD services may be configured or tuned in such a way as to make them efficient for serving large resources, whereas other CD services may be configured or tuned to be more efficient in serving small resources. Tuning/configuration of a node may include how much physical memory it has, the number/size of its disk drives, whether it has spinning drives or solid state drives (SSDs), and what software is running on it. Those of ordinary skill in the art will realize and appreciate, upon reading this description, that these attributes combine to specify which sort of resources a particular machine or CDN node is best equipped to serve. For example, a machine with a large number of spinning drives but not much memory may be well suited to serve very large resources that can be streamed off of disk. Conversely, for libraries of large numbers of not very popular small resources, a machine will want to have a large number of SSDs so that access time to them is sufficiently rapid. Machines with lots of physical memory can then deal well with a working set of large or small resources that fit into memory much more efficiently than needing to go to disk. Machines with a lot of CPU power would be preferred for resources that require a lot of manipulation (e.g., scrubbing, edge-side-include, or other "application at the edge" processing).

In general, the more the proxy 106 knows about the requested content the better (more appropriate) its parent CD service selection should be. In this regard, the proxy 106 may query one or more attribute databases 110 to determine attributes about the requested content (e.g., resources). The attribute database(s) 110 preferably provide attributes such as resource size. In preferred exemplary embodiments hereof client requests are HTTP requests (which includes HTTPS requests) that take the form of URIs or URLs, and the attribute database(s) 110 may be indexed using URLs. As used herein, an appropriate CD service for a particular request may be one that is sufficiently configured (e.g., with hardware and/or software) to process that particular request. It should be appreciated that while other CD services may be able to process a particular request, an appropriate CD service will preferably process that particular request efficiently (or at least as efficiently as other CD services).

As noted, the proxy 106 selects an appropriate parent CD service (e.g., server) to process the client request. The selected CD service (e.g., parent server) may provide the requested content (R) to the requesting client, possibly via the proxy slicer 106. In some cases the selected CD service may obtain the requested content from another location such as an origin server 112 associated with the content's provider. As described, a proxy acts as a contact point that forwards requests to appropriate back-end machines based on which particular content (e.g., resource) is being requested. That is, a proxy may receive all requests for content, but send fill requests for large resources to those machines tuned for large resources, and fill requests for small resources to those machines tuned for small resources (or whatever criteria maps to the tuning of the machines).

Figure 2A:
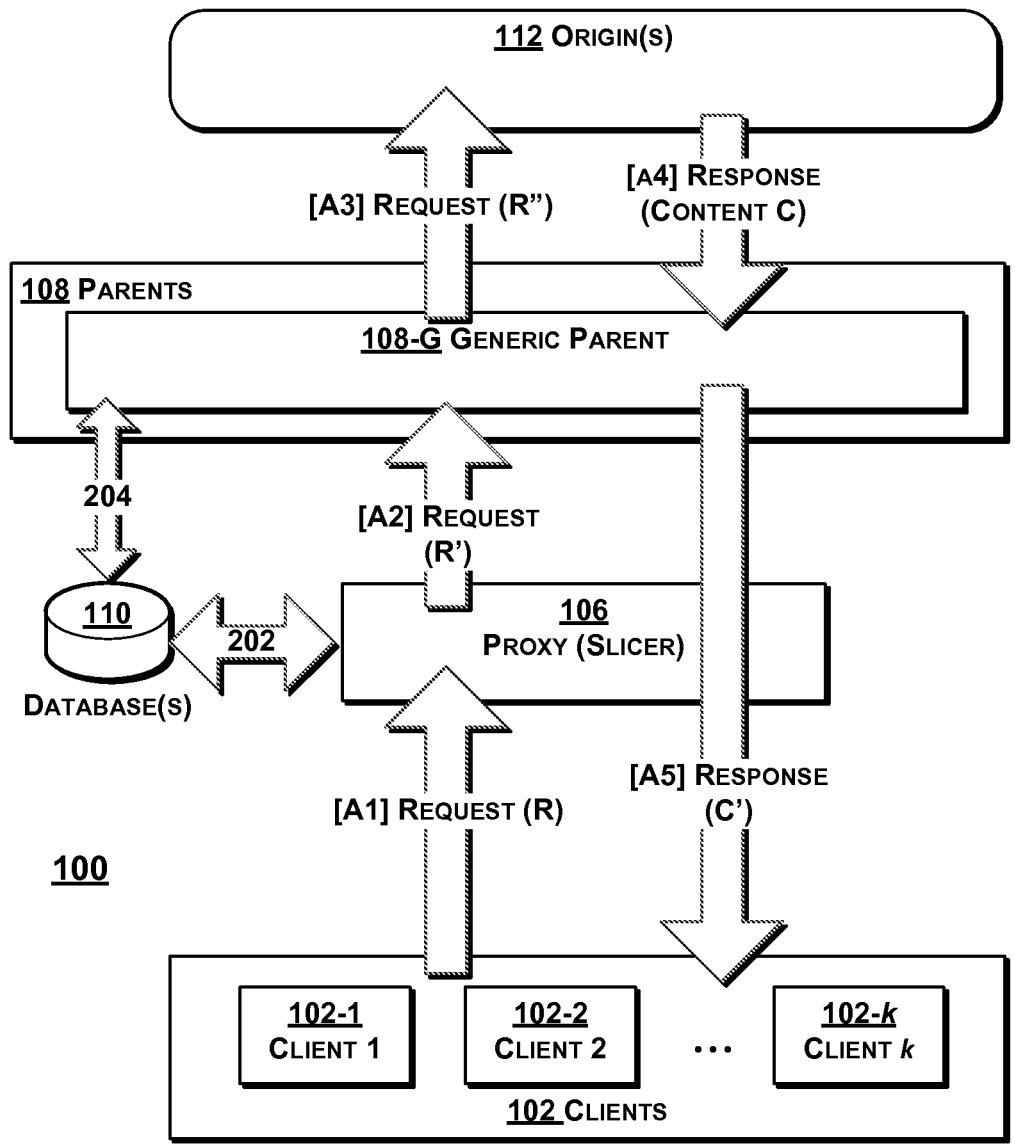
FIGS. 2(A)-2(B) show aspects of an exemplary content delivery network (CDN) according to exemplary embodiments hereof.

Aspects of request processing are described with reference now to FIG. 2(A), for a case when the proxy 106 does not have sufficient (or any) information to allocate the request to an appropriate parent server. A client 102 makes a request R for content (at A1 in FIG. 2(A)). The request R is directed to a proxy 106 which looks up information about the request R in the attribute database(s) 110 (at 202). In this case there is insufficient information in the database(s) 110 to allow proxy 106 to make an appropriate determination. In particular, in some implementations, proxy 106 may not have information about the size of the content associated with request R. Proxy 106 then sends/assigns (at A2) the request R to a generic (or arbitrary) parent CD service 108-G.

As used herein, a generic CD service refers to any CD service that may be able to process the request R, although that generic service may not be appropriate or optimal to process the request.

The parent CD service 108-G requests the content associated with request R (at A3) (e.g., from the appropriate origin service 112), and then provides the requested content C to the requesting client (possibly via the proxy 106) (at A4-A5). The parent CD service 108-G also tracks and maintains information about the content C, including, preferably, the size of content C. Parent CD service 108-G may then update the attribute database(s) 110 (at 204) with information about content C. In some cases parent CD service 108-G may also (or instead) provide some of the attributes about the content C in headers with C.

Figure 2B:
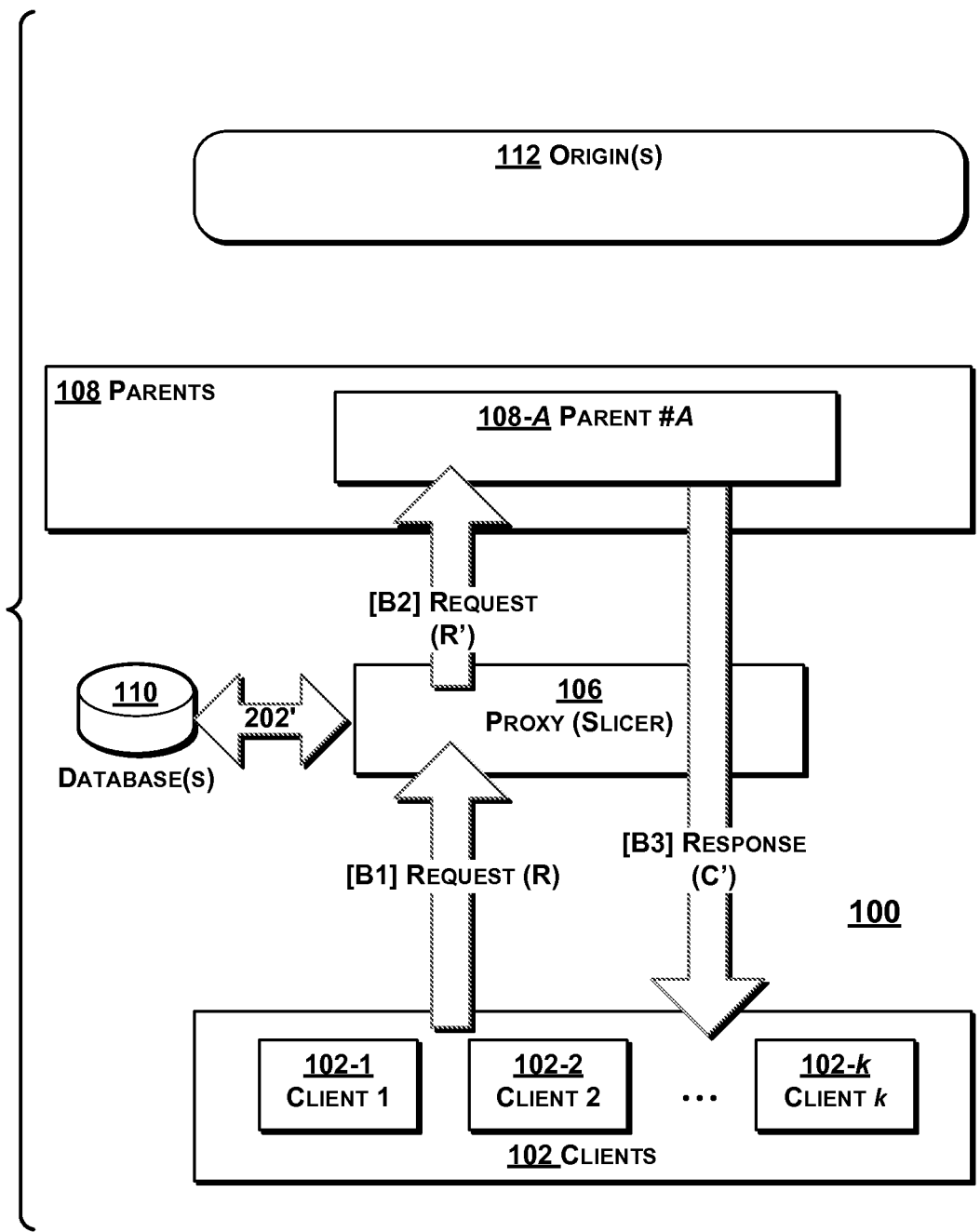

When the proxy 106 receives a request for content that has previously been processed, information about C may already be in the database(s) 110. As shown with reference now to FIG. 2(B), a client 102 makes a request R (at B1). The request is directed to the proxy 106 that determines information about the content C associated with R. For example, proxy 106 may query the database(s) 110 (at 202') to obtain attribute data about content C (e.g., the size of content C). Since in this case proxy 106 has sufficient information, it assigns the request R' to an appropriate CD service (e.g., parent #A 108-A) (at B2). The CD service 108-A processes the request (at B3), providing the requested content C to the requesting client (possibly via the proxy 106).

Note that the CD service 108-A that processes the request may access and/or update the attribute database(s) 110, e.g., to add information about popularity of the content C.

Figure 3A:
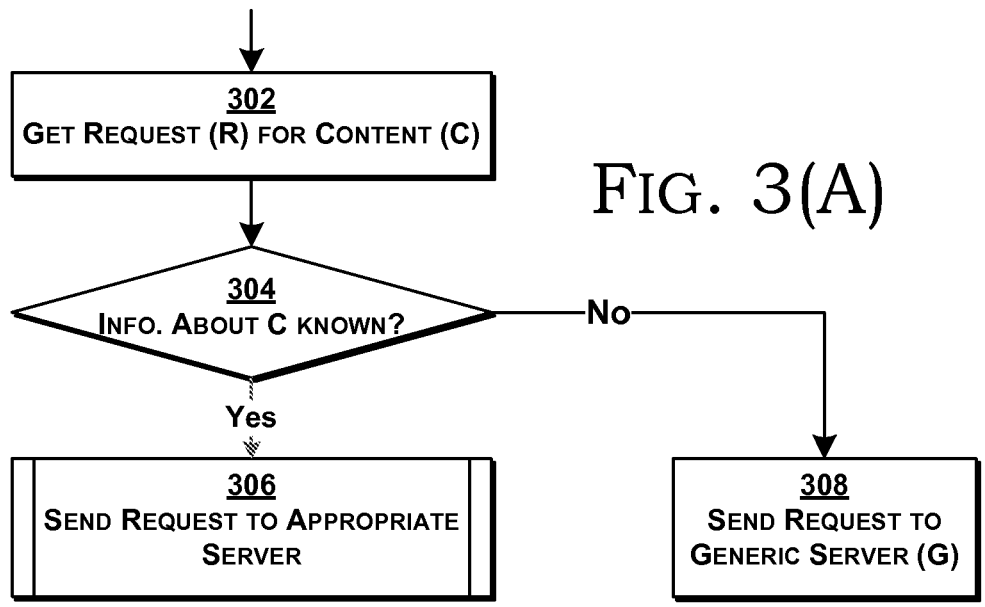
FIGS. 3(A)-3(B) are flowcharts showing aspects of processing according to exemplary embodiments hereof.

Aspects of processing by various entities are described with reference to the exemplary flowcharts in FIGS. 3(A)-3(B). With reference to the flowchart in FIG. 3(A), showing aspects of the processing by proxy 106, the proxy 106 gets a request (R) for content (C) (at 302). The proxy 106 determines (at 304) whether it has sufficient information about the requested content C (e.g., the size or popularity of C). Proxy 106 may access one or more databases to determine information about content C. If the proxy 106 does not have and cannot ascertain sufficient information about content C to make an assignment of the request to an appropriate CD service (e.g., parent server) then (at 308), the proxy 106 sends the request R to a generic CD service (G) (e.g., generic parent server). On the other hand, if the proxy 106 determines (at 304) that it does have (or can ascertain) sufficient information about the requested content C to make an assignment of the request to an appropriate CD service then (at 306) the proxy 106 may send the request to an appropriate CD service (e.g., server).

Figure 3B:
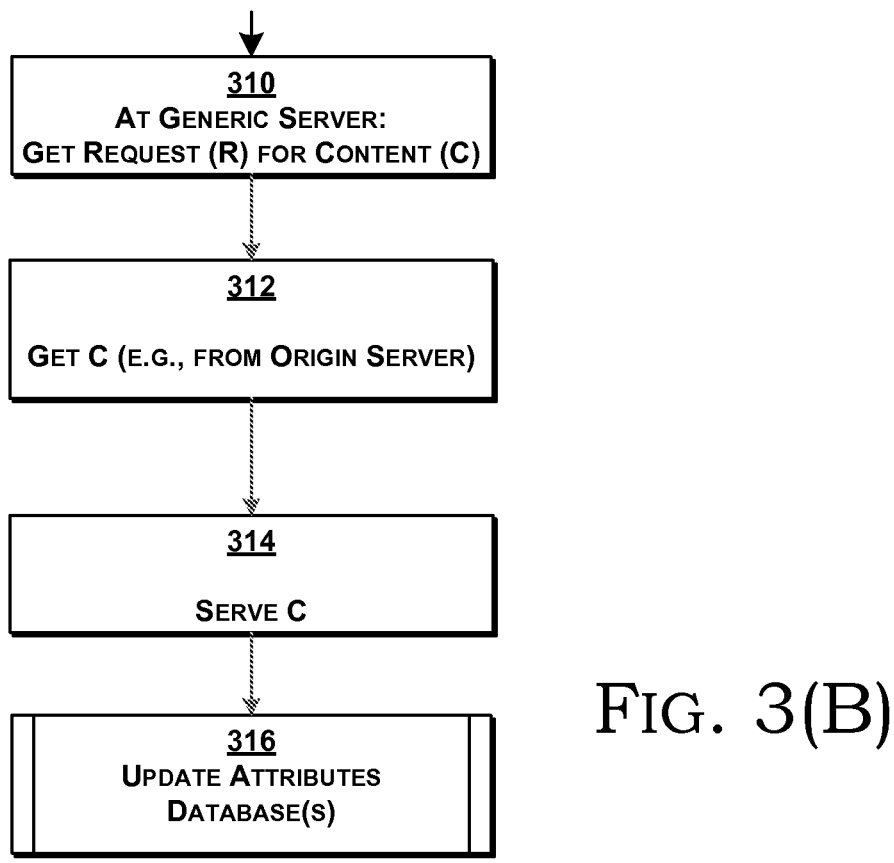

With reference to the flowchart in FIG. 3(B), showing aspects of the processing by a generic server (G) (e.g., one that received a request from the proxy 106 (at 308), the generic server (G) obtains the request R for content C (at 310). In this case the request arrived at server G because the proxy 106 did not have sufficient information about content C to select an appropriate server. It may still be the case, however, that the generic server G has or knows information about the content C. If the generic server G knows information about the content C or has a copy, then that information about C is updated in the attributes database(s). The generic server C gets a copy of the requested content (C) (at 312), e.g., from an origin server, and then serves the content C to the requesting client (at 314). The generic server then updates the attribute database(s) (at 316) to include information it has ascertained about the content C (e.g., the size of the content). The generic server may also (or instead) attach metadata to the response indicating a categorization of the resource, if needed. The next time a request is received at that proxy slicer for that resource, it could make use of the cached meta data to direct the fill request to the appropriate parent host. If the next request arrived at a different slicer, it might contact the same generic parent which could redirect it to the appropriate parent. It should be appreciated that when a request is processed by an appropriate server (sent at 306), the appropriate server may also update the attribute database(s) to include information it ascertains about the content C. Similarly, the appropriate server may also (or instead) attach metadata to the response indicating a categorization of the resource.

It should be appreciated that the CDN may need to re-learn about resources as they expire. For this reason it is preferable that CD services that process requests update the database(s) (or cause them to be updated) based on current information about resources.

Thus is described a system in which a CDN may determine categorization of requests as it sees them. The CDN may learn about content (e.g., resources), and which category each resource would fall into, as it sees requests for the resources and adapt appropriately.

Computing

Figure 4:
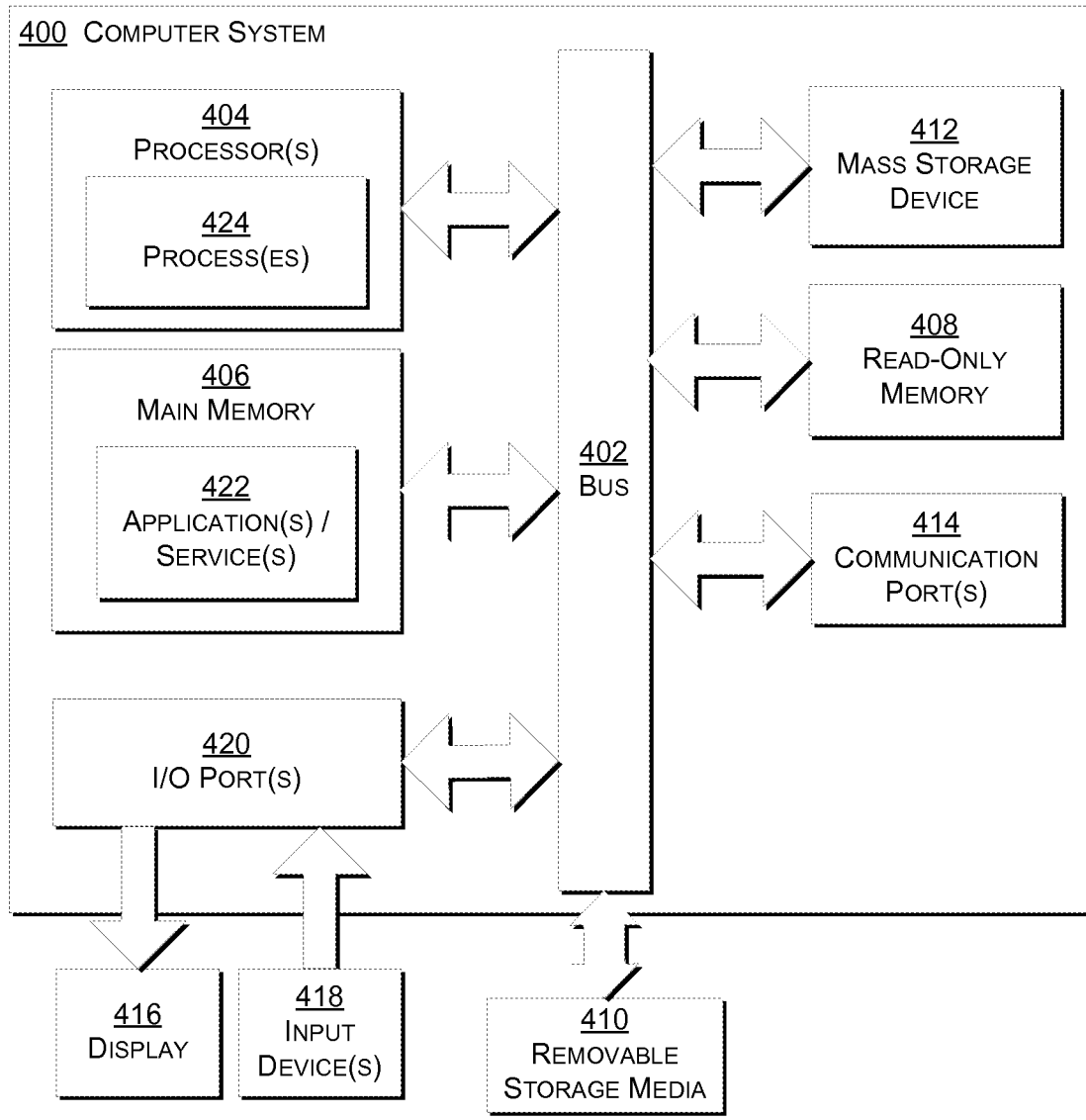
FIG. 4 depicts aspects of computing according to exemplary embodiments hereof.

FIG. 4 is example schematic diagram of a computing system 400 implementing a proxy, a parent server, or other computing device that may be used to perform the processes discussed herein. The computing system includes a bus 402 (i.e., interconnect), at least one processor 404, at least one communication port 414, a main memory 406, a removable storage media 410, a read-only memory 408, and a mass storage device 412. Processor(s) 404 can be any known processor, such as, but not limited to, an Intel® Itanium® or Itanium 2® processor(s), AMD® Opteron® or Athlon MP® processor(s), or Motorola® lines of processors. Communication port 414 can be any of an RS-232 port for use with a modem based dial-up connection, a 10/100 Ethernet port, a Gigabit port using copper or fiber, or a USB port. Communication port(s) 414 may be chosen depending on a network such as a Local Area Network (LAN), a Wide Area Network (WAN), or any network to which the computer system connects. The server may be in communication with peripheral devices (e.g., display screen 416, input device 418 via Input/Output (I/O) port 420.

Main memory 406 can be Random Access Memory (RAM) or any other dynamic storage device(s) commonly known in the art. Read-only memory 408 can be any static storage device(s) such as Programmable Read-Only Memory (PROM) chips for storing static information such as instructions for processor 404. Mass storage device 412 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 402 communicatively couples processor(s) 404 with the other memory, storage and communications blocks. Bus 402 can be a PCI/PCI-X, SCSI, or Universal Serial Bus (USB) based system bus (or other) depending on the storage devices used. Removable storage media 410 can be any kind of external hard drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions.

As shown, main memory may be encoded with one or more applications/services 422 that support functionality as discussed above with respect to the various figures and elsewhere. For example, in one embodiment, the application 422 may include or otherwise implement the various processes and/or instructions described herein. The application 422 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 404 accesses main memory 406 via the use of bus 402 in order to launch, run, execute, interpret or otherwise perform the logic instructions of the application 422. Execution of the application 422 produces processing functionality in application process 424. In other words, the process 424 represents one or more portions of the application 422 performing within or upon the processor(s) 404 in the computer system 400.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

Conclusion

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A computer-implemented method, operable with a content delivery network (CDN), the method comprising:
   by a node in the CDN,
   (A) receiving a request for content stored in an origin server;
   (B) attempting to determine information about the content, wherein the information comprises at least a size of the content;
   (C) based on the attempt to determine in (B),
      (C)(1) when the size of the content is determined, determining, based on the size of the content, an appropriate content delivery (CD) service to process the request and assigning the request to the appropriate CD service to process the request, wherein the appropriate CD service comprises a server of a different node in the CDN; and
      (C)(2) when the size of the content is not determined, assigning the request to a generic CD service to process the request, wherein the generic CD service comprises at least one server; and
   (D) when the request is assigned to the generic CD service in (C)(2), then the generic CD service:
      (D)(1) processing the request; and
      (D)(2) providing updated information about the content, including the size of the content.

2. The method of claim 1 wherein the appropriate CD service and the generic CD service are selected from caching CD services.

3. The method of claim 1 wherein the request is an HTTP request for a resource.

4. The method of claim 1 wherein the request comprises a URI or URL and wherein the determining information about the request in (B) comprises accessing a mapping from the URL to the information about the content associated with the request.

5. The method of claim 4 wherein the URL corresponds to a particular resource.

6. The method of claim 4 wherein the providing updated information about the content in (D)(2) comprises updating the mapping.

7. The method of claim 6 wherein the mapping is maintained in one or more databases.

8. The method of claim 1 further comprising:
   (E) when the request is assigned to the appropriate CD service in (C)(1), then the appropriate CD service:
      (E)(1) processing the request; and
      (E)(2) providing updated information about the content.

9. A computer-implemented method, operable with a content delivery network (CDN), the method comprising:
   by a node in the CDN,
   (A) receiving a request for content stored in an origin server;
   (B) attempting to determine a category for the content;
   (C) based on the attempt to determine in (B),
      (C)(1) when the category for the content is determined, determining, based on the category, an appropriate content delivery (CD) service to process the request and assigning the request to the appropriate CD service to process the request, wherein the appropriate CD service comprises a server of a different node in the CDN; and (C)(2) when the category for the content is not determined, assigning the request to a generic CD service to process the request, wherein the generic CD service comprises at least one server; and (D) when the request is assigned to the generic CD service in (C)(2), then the generic CD service:
(D)(1) processing the request; and
(D)(2) providing the category for the content.

10. The method of claim 9 wherein the category for the content is based on a size of the content.

11. The method of claim 10 wherein the request is an HTTP request and wherein the content comprises one or more resources.

12. A computer program product having computer readable instructions stored on non-transitory computer readable media, the computer readable instructions including instructions for implementing a computer-implemented method, the method operable on a device comprising hardware including memory and at least one processor and running a service on the hardware, the method operable in a content delivery service (CDN), the method comprising:

by a node in the CDN,
(A) receiving a request for content stored in an origin server;
(B) determining information about the content, wherein the information comprises at least a size of the content;
(C) based on the determining in (B),
(C)(1) when the size of the content is determined, determining, based on the size of the content, an appropriate content delivery (CD) service to process the request and assigning the request to the appropriate CD service to process the request, wherein the appropriate CD service comprises a server of a different node in the CDN; and
(C)(2) when the size of the content is not determined, assigning the request to a generic CD service to process the request, wherein the generic CD service comprises at least one server; and (D) when the request is assigned to the generic CD service in (C)(2), then the generic CD service:
(D)(1) processing the request; and
(D)(2) providing updated information about the content, including the size of the content.

13. The computer program product of claim 12 wherein the appropriate CD service and the generic CD service are selected from caching CD services.

14. The computer program product of claim 12 wherein the request is an HTTP request for a resource.

15. The computer program product of claim 12 wherein the request comprises a URI or URL and wherein the determining information about the request in (B) comprises accessing a mapping from the URL to the information about the content associated with the request.

16. The computer program product of claim 15 wherein the URL corresponds to a particular resource.

17. The computer program product of claim 15 wherein the providing updated information about the content in (D)(2) comprises updating the mapping.

18. The computer program product of claim 17 wherein the mapping is maintained in one or more databases.

19. The computer program product of claim 12 further comprising:
(E) when the request is assigned to the appropriate CD service in (C)(1), then the appropriate CD service:
(E)(1) processing the request; and
(E)(2) providing updated information about the content.

* * * * *